United States Patent [19]
Garrison

[11] 3,847,072
[45] Nov. 12, 1974

[54] LOOSE HAY WAGON

[75] Inventor: Harold Keith Garrison, Newton, Kans.

[73] Assignee: Hesston Corporation, Hesston, Kans.

[22] Filed: Apr. 18, 1973

[21] Appl. No.: 352,123

Related U.S. Application Data

[60] Continuation of Ser. No. 83,665, Oct. 23, 1970, abandoned, which is a division of Ser. No. 815,894, April 14, 1969, Pat. No. 3,556,327.

[52] U.S. Cl.................... 100/35, 100/100, 100/215, 100/218, 100/278
[51] Int. Cl............................................. B30b 9/30
[58] Field of Search....... 100/35, 42, 100, 215, 218, 100/232, 278; 56/1, DIG. 2, 341–360; 214/83.28, 82, 501, 510, 519–522; 302/56

[56] References Cited
UNITED STATES PATENTS

| 51,500 | 12/1865 | Wallace | 56/346 |
| 523,707 | 7/1894 | Keith | 56/341 UX |
| 1,314,437 | 8/1919 | Silverthorne | 100/215 UX |
| 2,767,963 | 10/1956 | Ringen et al | 214/520 UX |
| 3,412,532 | 11/1968 | Nickla | 100/215 X |

FOREIGN PATENTS OR APPLICATIONS

| 951,698 | 3/1964 | Great Britain | 56/341 |
| 267,946 | 1/1969 | Austria | 56/345 |

Primary Examiner—Harvey C. Hornsby
Assistant Examiner—Philip R. Coe
Attorney, Agent, or Firm—Schmidt, Johnson, Hovey & Williams

[57] ABSTRACT

A stack is formed by blowing a crop into the body of a vehicle as it is advanced across the field and by periodically lowering the roof of the body against the crop to compress it into a compact condition, the outlet of the blower being constantly swung back and forth to distribute the crop evenly across the body, and having a shiftable deflector for distributing the hay throughout the body in a fore and aft direction.

7 Claims, 12 Drawing Figures

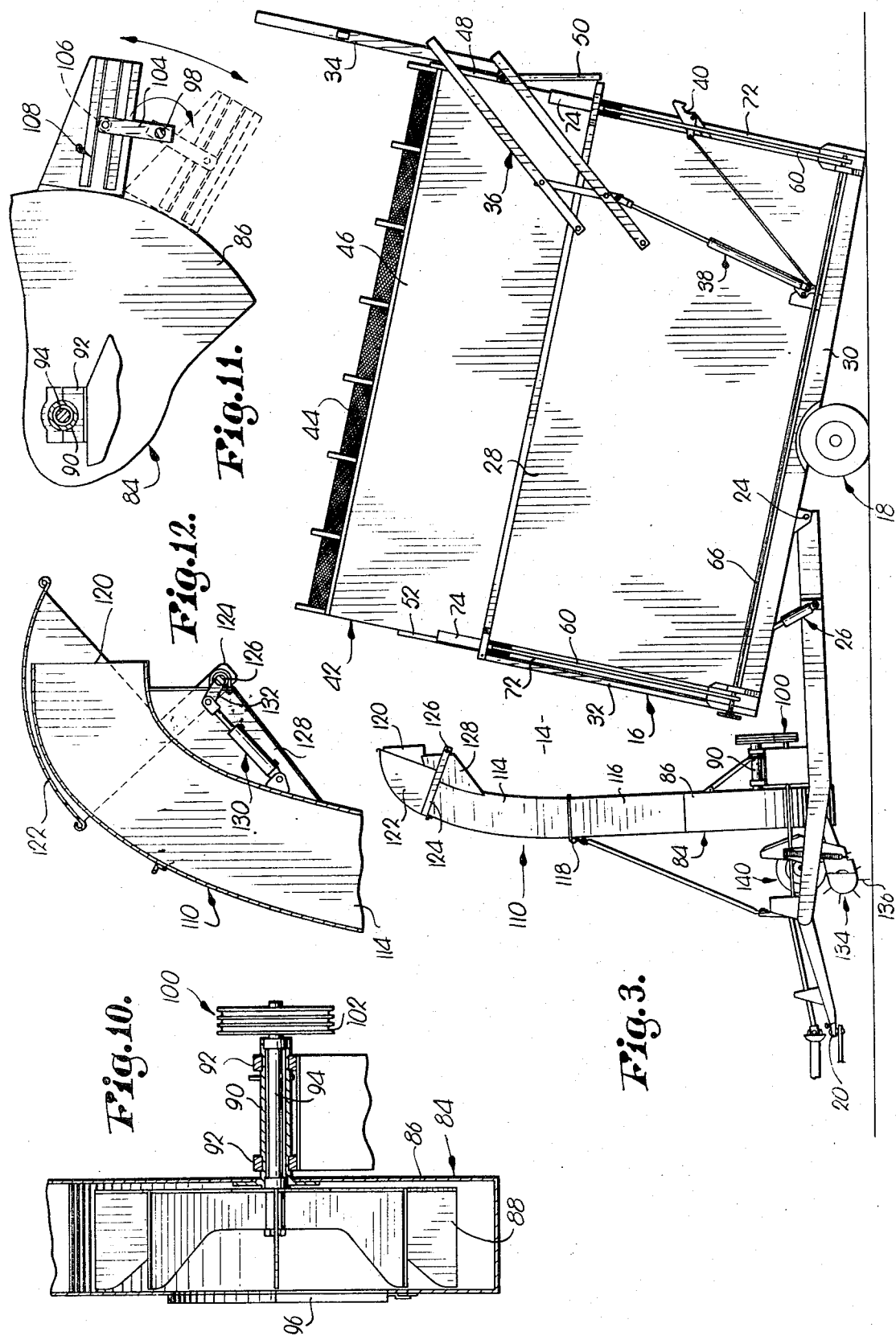

LOOSE HAY WAGON

This is a continuation of my copending application Ser. No. 83,665 filed Oct. 23, 1970, now abandoned, which was, in turn, a division of my application Ser. No. 815,894, filed Apr. 14, 1969, now U.S. Pat. No. 3,556,327 patented Jan. 19, 1971.

An important object of the present invention is to stack hay and other crops in a wagon as it is towed or otherwise advanced across the field to gather the crop, through use of a blower which receives the crop from a pickup and blasts it into the wagon, the necessary compaction being accomplished by use of the roof which is lowered from time to time against the crop in the wagon.

Another important object of my instant invention is to provide for even distribution of the crop in the wagon by swinging a blower outlet tube laterally of the wagon throughout the time the crop is being blown thereinto.

Still another important object of the instant invention is to assure even distribution of the crop longitudinally of the wagon by use of a swingable deflector hood at the discharge end of the constantly swinging blower tube.

In the drawings:

FIG. 3 is a view similar to FIG. 1, but showing the wagon in its unloading position;

FIG. 10 is a fragmentary, horizontal cross-sectional view of the blower and its mount;

FIG. 11 is a fragmentary cross-sectional view taken at right angles to FIG. 10 and looking forwardly, illustrating the crank unit for oscillating the blower outlet tube; and FIG. 12 is a fragmentary cross-sectional view at the upper end of the outlet tube illustrating its shiftable deflector hood.

Figure 1:
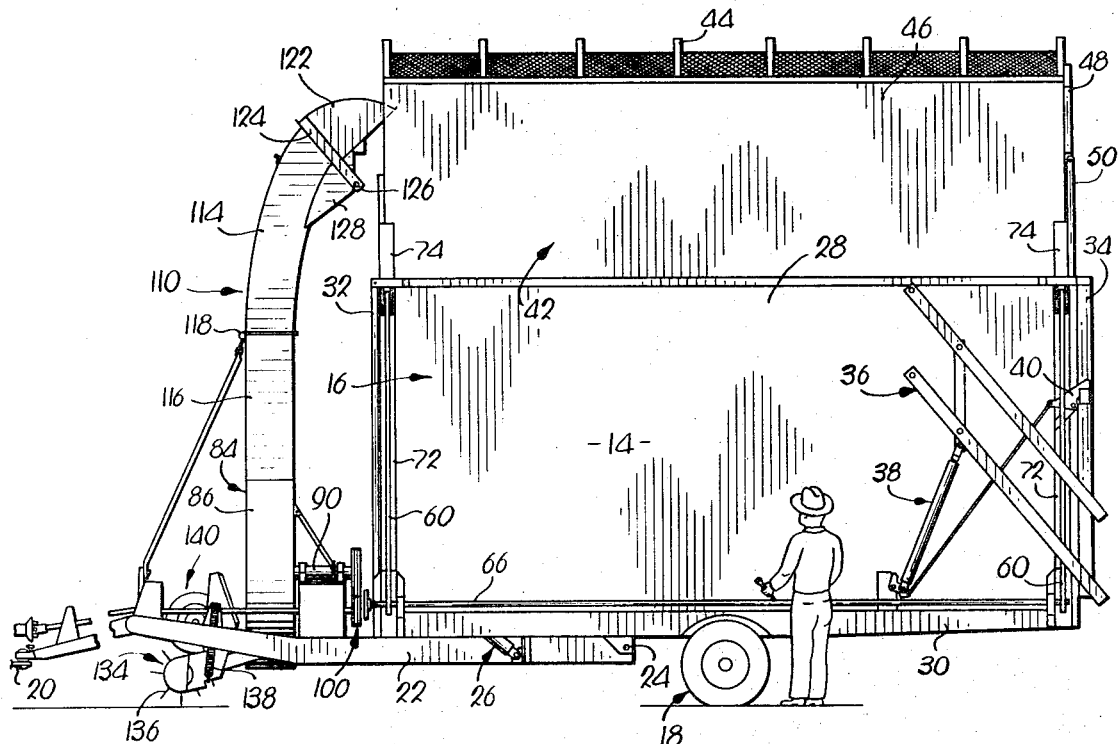
FIG. 1 is a side elevational view of a loose hay wagon made according to my present invention and capable of carrying out the steps of my novel method.
Figure 2:
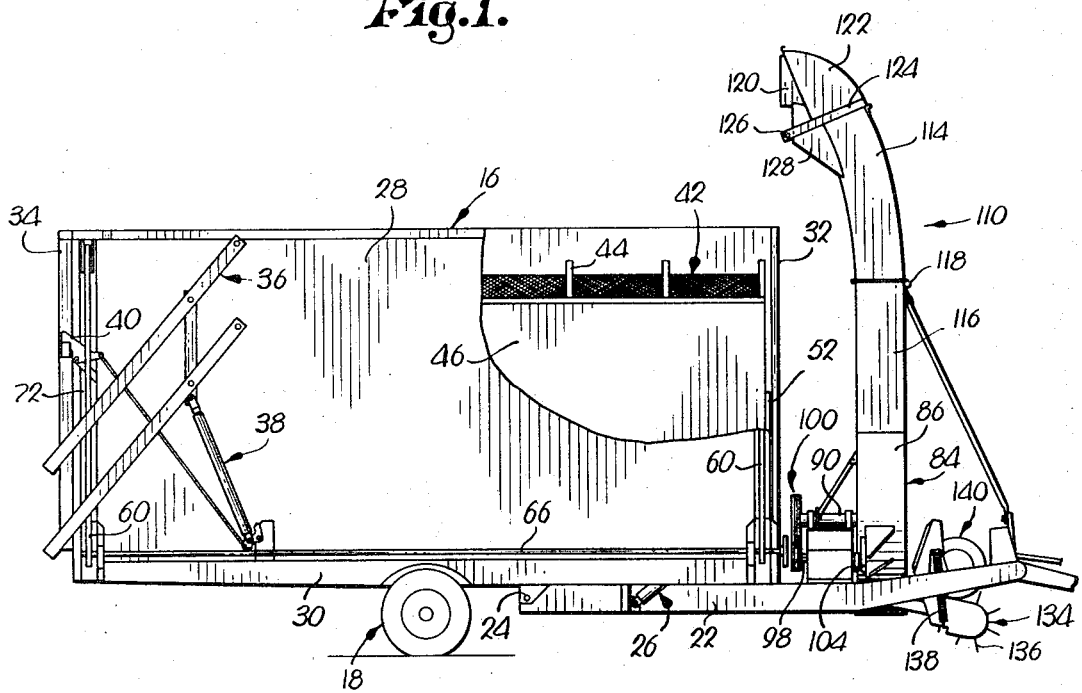
FIG. 2 is a view showing the opposite side of the wagon, parts being broken away for clearness, with the roof illustrated in its lowered position.
Figure 5:
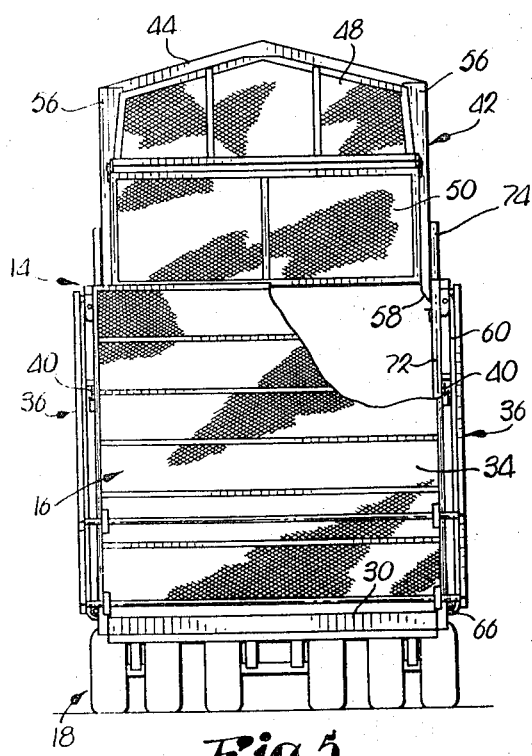
FIG. 5 is a rear view thereof.

Vehicle 14 shown in FIGS. 1–5 of the drawings has a crop-receiving body 16 supported by a wheel and axle assembly 18, and adapted for advancement across a field by a towing hitch 20 at the front end of a frame 22, body 16 having a swinging connection 24 with the rear end of frame 22 to permit it to be tilted, as shown in FIG. 3, upon actuation of fluid piston and cylinder assemblies 26. Body 16 has sides 28, a bed 30, a front end wall 32 and a rear end gate 34 which may be raised as shown in FIG. 3 by parallel linkage 36 supporting gate 34 on each of the sides 28, each such linkage 36 being in turn provided with a fluid piston and cylinder assembly 38 for actuating the same after release of latches 40 (FIGs. 2 and 3).

Figure 4:
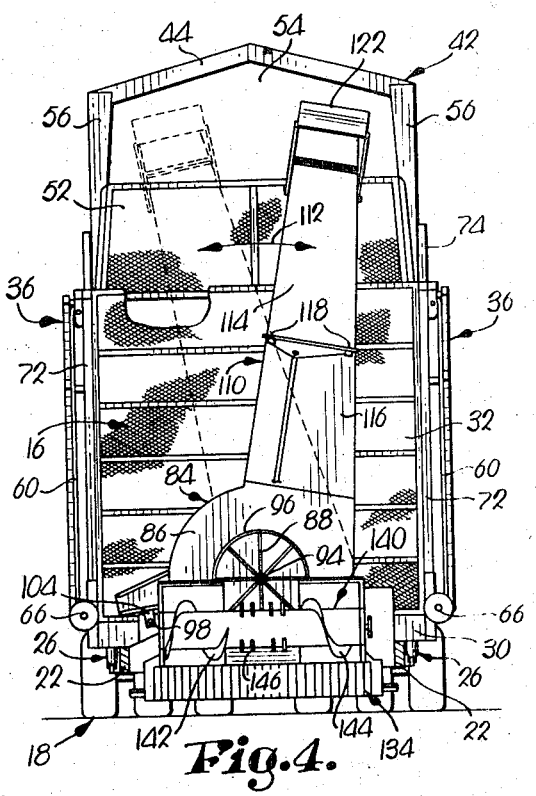
FIG. 4 is a front view of the wagon.
Figure 7:
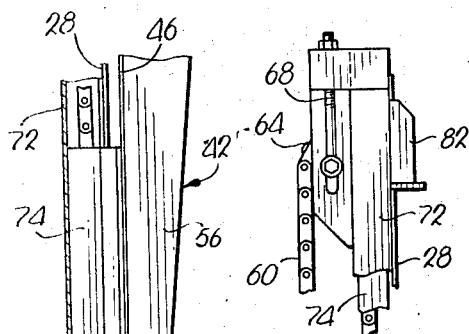
FIG. 7 is a detailed view similar to FIG. 6 showing the upper end of the roof actuating mechanism at one corner of the wagon.
Figure 6:
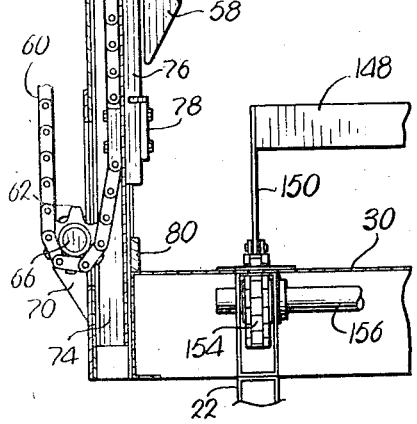
FIG. 6 is a fragmentary, vertical cross-sectional view illustrating the roof raising and lowering mechanism as well as the stack unloading structure.

A press 42 carried by the body 16 therewithin for vertical reciprocation has a pitched roof 44, sides 46, a rear end 48 adjacent roof 44, an outwardly swingable end gate 50 (FIG. 3) held in place by gate 34 when press 42 is raised (FIG. 1) and a front end wall 52 extending upwardly from end 32 when press 42 is raised, but spaced below the roof 44, presenting an inlet 54 to the body 16 (FIG. 4). Sides 46 are fastened to tapered studs 56 (FIG. 6) which terminate in triangular feet 58, at least certain of the studs 56 being attached to continuous chains 60, preferably at least one at each of the four corners of body 16 (FIGS. 1 and 2) and trained about sprocket wheels 62 and 64, driven by shafts 66 (FIG. 4) extending longitudinally of the body 16 exteriorly of sides 28 adjacent bed 30 (FIGS. 1 and 2) held taut by adjustable take-up means 68 (FIG. 7) and supported by bearings 70 on the sides 28.

Figure 8:
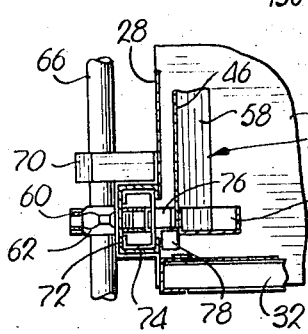
FIG. 8 is a fragmentary, horizontal cross-sectional view at said corner.

The sides 28 of body 16 are provided with an upstanding, C-shaped guide 72 for each chain 60 respectively which in turn receives a vertically reciprocable, C-shaped slide 74 (FIG. 8) through which the inner stretch of chain 60 extends, each chain 60 being connected to its slide 74 and to a vertical strip 76 (joined to a corresponding stud 56) by a clamp 78, the strips 76 being engageable with stops 80 adjacent bed 30 within body 16 to limit the extent of descent of press 42. Clamps 78 engage stops 82 within body 16 adjacent take-up means 68 to limit the extent of ascent of press 42.

A blower 84, carried by frame 22 forwardly of body 16, has a housing 86 for fan 88, housing 86 being provided with a sleeve 90 (FIG. 10) extending fore and aft of vehicle 14 and supported by bearings 92, shaft 94 for fan 88 being rotatable within the sleeve 90 and being aligned with inlet 96 in the front of housing 86 opposed to sleeve 90. A shaft 98 (FIGS. 1–4 and 11) carried by frame 22 in parallelism with shaft 94, and driven by the latter through belt and pulley means 100 as pulley 102 on shaft 94 is driven, has a crank 104 rigid thereto and provided with a roller 106 that rides in a track 108 which extends radially outwardly from housing 86, to thereby oscillate the housing 86 and its discharge tube 110 about the axis of shaft 94 during rotation of fan 88, as shown by arrows 112 in FIG. 4.

Tube 110 has an upper section 114 and a lower section 116 connected by hinge 118, permitting the swinging of section 114 forwardly and downwardly during over-the-road travel of vehicle 14 when press 42 is lowered as shown in FIG. 2, the section 114 terminating in a curved outlet 120 normally directed toward the inlet 54 of press 42. A complementally curved deflector hood 122 above section 114 has arms 124 (FIG. 12) rigid to a shaft 126 which is in turn supported by bracket 128 beneath section 114, shaft 126 being reciprocated by a fluid piston and cylinder assembly 130 coupled with its crank 132.

Frame 22 carries a pickup unit 134 (FIGS. 1–4) therebeneath forwardly of the blower 84 which includes a drum rotatable about a horizontal axis transversely of the vehicle 14 and provided with foldable spring tines 136, the unit being vertically adjustable and suspended by springs 138, all of which is conventional and well known. Unit 134 feeds the crop (preferably from a windrow) to an auger drum 140 rotatable on frame 22 in parallelism with unit 134 above the latter and forwardly of housing 86. Drum 140 has left- and right-hand flighting 142 and 144 (FIG. 4) for feeding the crop to retractable fingers 146 of drum 140 which, in turn, deliver the hay into housing 86 through inlet 96 into the path of the blades of fan 88.

Figure 9:
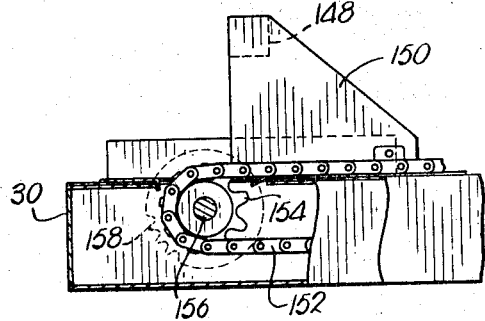
FIG. 9 is a fragmentary cross-sectional view at right angles to FIG. 6 showing a portion of the unloading structure.

A pusher bar 148 (FIGS. 6 and 9) used when the body is tilted as shown in FIG. 3, traverses the body 16 therewithin above the bed 30, the bar 148 being secured to a pair of spaced, upstanding plates 150 each of which is secured to a continuous chain 152 extending longitudinally of the bed 30. Each chain 152 is trained about spaced sprocket wheels 154 that are rigid to transverse shafts 156 below the bed 30, one of such shafts 156 being driven from a sprocket wheel 158 thereon.

In operation, the pickup unit 134, the auger drum 140 and the fan 88 are continuously operated, and at the same time, by virtue of rotation of shaft 94, to rotate the shaft 98, crank 104 will oscillate the blower 84 causing the crop to spread evenly across the body 16. The initial blast of the crop from the outlet 120 of tube 110 through the inlet 96 will be directed toward the gate 34 of body 16 and the end 48 and gate 50 of press 42, by virtue of withdrawal of the deflector hood 122. As the crop builds up to the roof 44 at the rear of the body 16, the operator of the tractor (not shown) which pulls the vehicle 14 will cause actuation of the assembly 130 to gradually project the hood 122 rearwardly and downwardly toward the body 16 so as to cause the crop to completely fill body 16 as high as the fully elevated roof 44. After buildup to the inlet 96, the forward advance of the vehicle 14 is temporarily discontinued while the operator lowers the press 42 by causing actuation of the drive (not shown) for the shafts 66.

The studs 56 during their descent will slide easily, wedging themselves between the crop in body 16 and the proximal side walls 28 as led by their feet 58 and, at the same time, the roof 44 will compress the crop tightly against the bed 30, causing the crop to begin to take on the configuration of a compact stack conforming in shape with the transverse configuration of the body 16.

The loading operation is then resumed after raising the press 42, continuing to spread the crop evenly both fore and aft of the body 16 and laterally thereof until no additional material can be effectively blasted through the inlet 96, whereupon the compression step is repeated. After the last lowering of the press 42 it need not be again raised until the vehicle 14 has been towed to a desired unloading zone. The gate 34 is then raised and the body 16 tipped as shown in FIG. 3. The stack is then ejected from the body 16 through use of pusher bar 148 as the vehicle 14 is pulled forwardly, leaving the stack deposited on the ground or other support.

The resulting stack, in a highly compact condition, conforms in size and shape with the body 16 and is properly crowned so as to shed water by virtue of the pitched nature of the roof 44. Virtually no hand labor is required and after unloading, the stack remains fully formed with little danger of spoilage along the sides, ends or over the top of the stack.

I claim:

1. The method of making a stack of hay which comprises the steps of:

feeding a stream of loose hay into a collapsible container having a pair of sections of substantially identical sizes and configurations, including a hollow, open top body provided with a bed, and a normally elevated open bottom press having a crowned roof, each being additionally provided with opposed, upright side and end walls, the press being restricted to vertical, rectilinear reciprocation and being an upper extension of the body, aligned and in registered communication with the latter, when the press is elevated;

placing as much of said hay into the container as can be held or practically contained by continuing said hay feeding step while the press is elevated until both the body and the press are filled with a loose mass of said hay; thereupon preforming said mass into the shape of a polygonal haystack by lowering the press into the body with a steady, continuous force sufficient to slip the press between the body and said mass to dispose the press over and around the mass, enclosing the latter within the press, surrounded by the side and end walls of the press, and confined between said roof and said bed; and condensing said preformed mass into a compact stack of substantially uniform density throughout, molded to the internal configuration of the press, by continuing said steady press lowering force without interruption to inwardly compress the preformed mass simultaneously end to end thereof, laterally thereof and from top to bottom thereof prior to raising the press to its normally elevated position.

2. The method as claimed in claim 1; and the additional step of continuously shifting said hay stream back and forth in the container thereacross while the latter is being filled to laterally distribute the loose hay evenly in the container.

3. The method as claimed in claim 1; and the additional step of deflecting said hay stream up and down in the container while carrying out said feeding step to evenly distribute the hay end to end of the container.

4. The method of making a stack of hay which comprises the steps of:

feeding a stream of loose hay into a collapsible container having a pair of sections of substantially identical sizes and configurations, including a hollow, open top body provided with a bed, and a normally elevated, open bottom press having a crowned roof, each being additionally provided with opposed, upright side and end walls, the press being restricted to vertical, rectilinear reciprocation and being an upper extension of the body, aligned and in registered communication with the latter, when the press is elevated, said feeding comprising the step of:

blowing the hay into the press end to end of the latter above said body along the lower surface of said roof with a blast of air currents;

exhausting the press of said air currents through the roof as the hay gravitates in the container toward said bed;

placing as much of said hay into the container as can be held or practically contained by continuing said hay blowing and air exhausting steps while the press is elevated until both the body and the press are filled with a loose mass of said hay; thereupon preforming said mass into the shape of a polygonal haystack by lowering the press into the body with a steady, continuous force sufficient to slip the press between the body and said mass to dispose the press over and around the mass, enclosing the latter within the press, surrounded by the side and end walls of the press, and confined between said roof and said bed; and condensing said preformed mass into a compact stack of substantially uniform density throughout, molded to the internal configuration of the press, by continuing said steady press lowering force without interruption to inwardly compress the preformed mass simultaneously end to end thereof, laterally thereof and from top to bottom thereof prior to raising the press to its normally elevated position.

5. The method as claimed in claim 4; and the additional step of continually shifting said hay-laden air currents back and forth across the press to laterally distribute the gravitating hay evenly in the container.

6. The method as claimed in claim 5; and the additional step of deflecting said hay-laden air currents up and down to evenly distribute the gravitating hay end to end of the container.

7. The method as claimed in claim 4; and the additional step of deflecting said hay-laden air currents up and down to evenly distribute the gravitating hay end to end of the container.

* * * * *